(No Model.)
J. E. BOLES.
BAND CUTTER AND FEEDER.
No. 487,363. Patented Dec. 6, 1892.
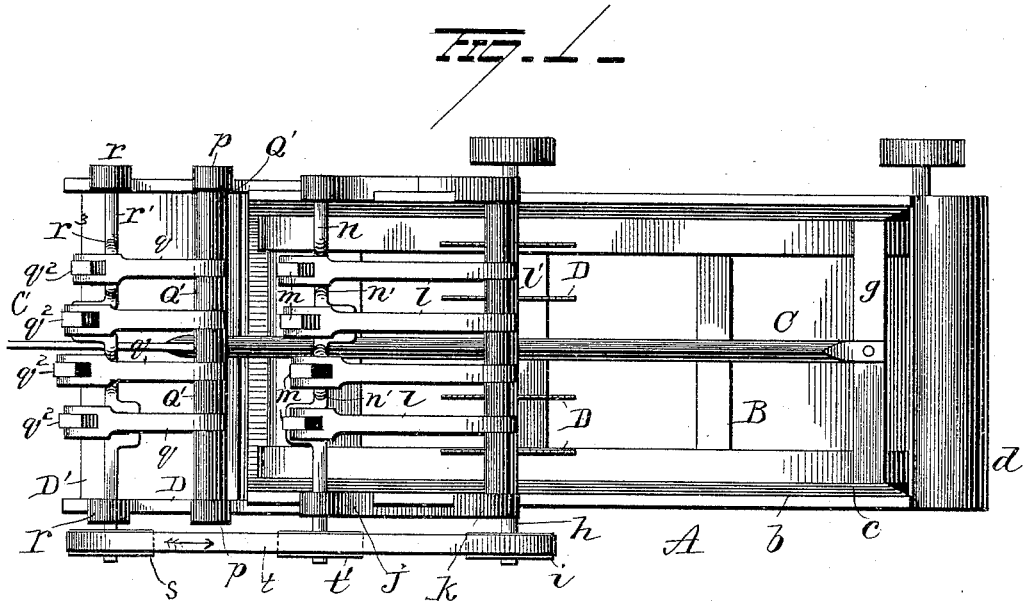
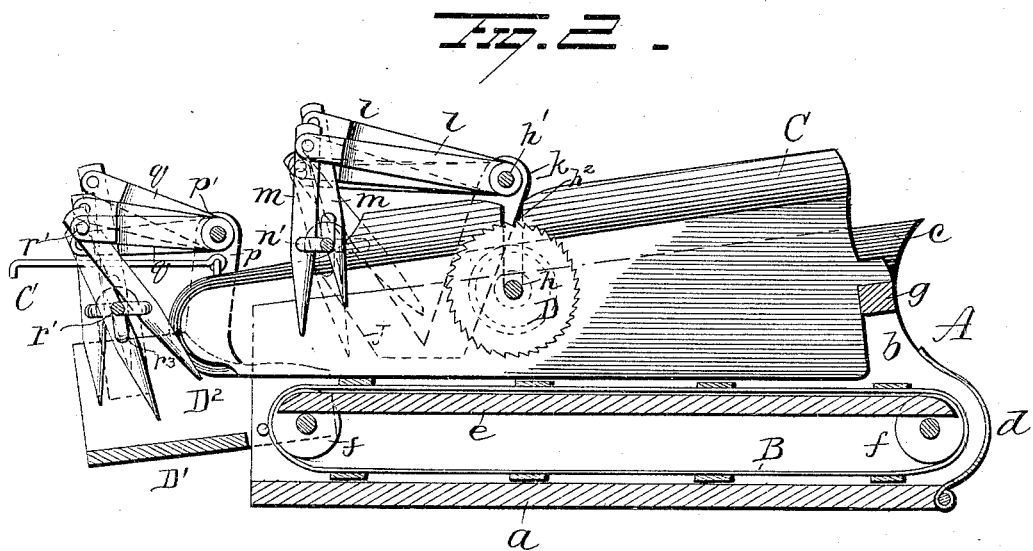
Witnesses
C. J. Nottingham
H. B. Armes
Inventor
Jacob E. Boles,
By H. A. Symmons
Attorney

UNITED STATES PATENT OFFICE.

JACOB E. BOLES, OF ALTA, IOWA, ASSIGNOR OF ONE-HALF TO A. WILSON, OF SAME PLACE.

BAND-CUTTER AND FEEDER.

SPECIFICATION forming part of Letters Patent No. 487,363, dated December 6, 1892.

Application filed December 1, 1891. Serial No. 413,670. (No model.)

*To all whom it may concern:*

Be it known that I, JACOB E. BOLES, residing at Alta, in the county of Buena Vista and State of Iowa, have invented certain new and useful Improvements in Band-Cutters and Feeders; and I do hereby declare the following to be a full, clear, and exact description of the invention, such as will enable others skilled in the art to which it appertains to make and use the same.

My invention relates to an improvement in band-cutters and feeders for thrashing-machines, its object being to produce a device of the class specified by means of which the straw and grain will be fed to the cylinder of a separator in a regular and even manner.

A further object is to construct the machine in such manner that the grain may be fed heads forward and in such manner that the bands of the bundles of grain can be readily cut by the cutters.

A further object is to so construct a band-cutter and feeder that it can be easily and quickly adjusted to any type of separator.

A further object is to so construct the machine that the escape of grain therefrom will be prevented.

A further object is to produce a band-cutter and feeder which shall be simple in construction, easy of application to a separator, and effectual in the performance of its functions.

With these objects in view the invention consists in certain novel features of construction and combinations and arrangements of parts, as hereinafter set forth, and pointed out in the claims.

In the accompanying drawings, Figure 1 is a plan view of my invention. Fig. 2 is a longitudinal sectional view.

A represents an open box or trough having a bottom $a$, sides $b$ with flaring upper edges, and a hinged end-gate $d$. The purpose of the hinged end-gate is to prevent the escape of grain and to admit of the insertion and removal of an endless carrier, hereinafter referred to.

Secured between the sides $b$ at a point somewhat above the bottom $a$ is a supplemental bottom $e$, said supplemental bottom being shorter than the main bottom $a$, so that any grain that might fall from the ends of the supplemental bottom $e$ will be caught by the bottom $a$, said supplemental bottom also acting as a support for the endless conveyer or carrier. Over rollers $f$ the bands of an endless conveyer or carrier B pass, whereby grain fed to one end of the box or trough A will be carried by the endless conveyer to the other end, where it will be discharged, and any grain which might fall on the bottom $a$ will be carried by the endless conveyer to the other end of the bottom $a$, and then over the supplemental bottom, and finally to the separator, the end-gate $d$ serving as a wall to prevent the grain from falling back or escaping from the slats of the conveyer.

The endless conveyer may be applied to the machine in any suitable manner, a convenient way being to buckle or otherwise fasten the ends of the bands comprising the conveyer after they are placed in position. Thus it will be seen that by making one end of the machine open and providing the other end with a hinged gate the conveyer may be readily placed in position.

Extending from one side to the other of the box or trough A, at the rear end thereof, is a bar $g$, to which a center board C is connected, said center board being disposed edgewise within the center of the box or trough A and extending beyond the forward or discharge end thereof and preferably being narrower at its forward end than at its rear end. By extending the center board beyond the forward end of the trough or box A the grain will be maintained in the proper position until it passes beyond the end of said trough or box, and by contracting the forward end of the center board sufficient room will be left above it for the pickers, hereinafter described.

The forward end of the center board C is provided with a hook C', adapted to be connected with the cap-plate of the separator, and thus support the forward end of the center board. The purpose of this board C is to maintain the bundles of grain practically parallel with the side boards, so that their bands may be readily cut by a series of revolving cutters D. The cutters D are made in the form of circular saws with fine teeth, so that they will cut the bands easily and quickly, and are carried by a shaft $h$, mounted in the sides $b$ of the box or trough and passing through a slot $h^2$ in the center board C, said shaft carrying at one end a wheel $i$.

Secured to and projecting upwardly from the sides $b$ of the box or trough A are brackets or standards $j$ $k$, the upper ends of the brackets or standards $j$ being forwardly of the upper ends of the brackets or standards $k$.

Mounted in the brackets $k$ and extending over the box or trough A is a shaft $h'$, to which is loosely connected a series of arms $l$, held properly spaced apart by means of a series of sleeves $l'$ on the shaft $h'$. The forward ends of the arms $l$ are bifurcated for the reception of pickers $m$, which are pivotally connected to the arms $l$. A shaft $n$ is mounted in the brackets or standards $j$ and made with a series of differently-disposed crank-arms $n'$, which are loosely connected to the depending pickers $m$, so that when said crank-shaft $n$ is rotated the pickers will have a vertical and oscillatory motion imparted to them, and thus separate the grain or straw and assist in delivering it to the separator.

Hinged or pivotally connected to the forward end of the box or trough A is an extension or feed-board D', having sides or flanges D².

Secured to the sides or flanges D² of the extension or feed board D' are uprights or brackets $p$, in the upper ends of which a shaft $p'$ is mounted. A series of arms $q$ is mounted loosely on the shaft $p'$ and held properly spaced apart by means of collars or sleeves $q'$. The forward ends of the arms $q$ are bifurcated for the reception of a series of depending pickers $q^2$, which are pivotally connected thereto. Brackets $r$ are secured to the sides of the extension or feed-board D' near their forward ends, and in these brackets a crank-shaft $r'$ is mounted. The crank-arms $r^3$ of the crank-shaft are connected loosely with the depending pickers $q^2$ at a point between their ends. A band-wheel $s$ is placed on the end of the shaft $r'$. A band $t$ is passed around the band-wheels $i$ $t'$ $s$.

A band-wheel may be located on any of the shafts for the reception of a band from the separator, whereby motion will be imparted to the cutters and pickers. Motion may be imparted to the endless apron or belt in any suitable manner. When the grain reaches the forward end of the box or trough A, it will be forced by means of the pickers $q^2$ in an even and regular manner into the separator, and by providing the hinged feed-board the device may be adjusted to any machine.

When flax or loose grain is fed by means of this machine, the center board may be removed. This may be accomplished by first removing the cutter-shaft and cutters, and after the removal of the center board the cutter-shaft and cutters may be readily replaced.

Having fully described my invention, what I claim as new, and desire to secure by Letters Patent, is—

1. The combination, with a box or trough, of pickers adapted to operate therein, a pivotally-connected feed-board at the discharge end of the trough or box, and pickers supported by the pivotally-connected feed-board and adapted to operate over the same, substantially as set forth.

2. The combination, with a box or trough and a pivotally-connected feed-board at its forward end, of a shaft over said box, arms loosely connected to said shaft, pickers depending from and pivotally connected to said arms, a crank-shaft connected to said pickers, a shaft supported by the feed-board, arms loosely connected to said shaft, pickers pivotally connected to said arms, a crank-shaft connected with said pickers, a shaft carrying cutters, band-wheels on said crank-shafts and the cutter-shaft, and a band passing over said band-wheels, substantially as set forth.

In testimony whereof I have signed this specification in the presence of two subscribing witnesses.

JACOB E. BOLES.

Witnesses:
W. C. GERNER,
JAS. DILLER.